US010553132B2

(12) United States Patent
Brenner et al.

(10) Patent No.: US 10,553,132 B2
(45) Date of Patent: Feb. 4, 2020

(54) CENTRAL PRESSURIZED CADAVER MODEL

(71) Applicants: Megan Brenner, Baltimore, MD (US); Thomas Scalea, Baltimore, MD (US)

(72) Inventors: Megan Brenner, Baltimore, MD (US); Thomas Scalea, Baltimore, MD (US)

(73) Assignee: University of Maryland, Baltimore, Baltimore, MD (US)

( * ) Notice: Subject to any disclaimer, the term of this patent is extended or adjusted under 35 U.S.C. 154(b) by 177 days.

(21) Appl. No.: 15/512,113

(22) PCT Filed: Sep. 17, 2015

(86) PCT No.: PCT/US2015/050660
§ 371 (c)(1),
(2) Date: Mar. 17, 2017

(87) PCT Pub. No.: WO2016/044577
PCT Pub. Date: Mar. 24, 2016

(65) Prior Publication Data
US 2017/0278431 A1 Sep. 28, 2017

Related U.S. Application Data

(60) Provisional application No. 62/051,331, filed on Sep. 17, 2014.

(51) Int. Cl.
*G09B 23/30* (2006.01)
(52) U.S. Cl.
CPC ......... *G09B 23/303* (2013.01); *G09B 23/306* (2013.01)

(58) Field of Classification Search
CPC ...... G09B 23/28; G09B 23/30; G09B 23/285; G09B 23/303; G09B 23/306; G09B 9/00
See application file for complete search history.

(56) References Cited

U.S. PATENT DOCUMENTS 4,820,525 A * 4/1989 Leonard ................. A61K 9/006
424/449
5,176,885 A * 1/1993 Impink, Jr. ............ B01D 59/30
210/660

(Continued)

OTHER PUBLICATIONS

Pham M, Kale A, Marquez Y, Winer J, Lee B, Harris B, Minnetti M, Carey J, Giannotta S, Zada G. A Perfusion-based Human Cadaveric Model for Management of Carotid Artery Injury during Endoscopic Endonasal Skull Base Surgery 2014. J Neurol Surg part B. 75:309-313.

*Primary Examiner* — Melba Bumgarner
*Assistant Examiner* — Amir A Klayman
(74) *Attorney, Agent, or Firm* — Benjamin Aaron Adler

(57) ABSTRACT

Provided are methods for creating a pressurized cadaver model used for surgical procedure training. In the method the internal jugular veins, common carotid arteries, brachial arteries, superficial femoral arteries and femoral veins thereof of a cadaver are exposed. One internal jugular vein is ligated and a drainage tube is disposed in the other internal jugular vein. An arterial catheter is inserted into one brachial artery and connected to a pressure transducer and an arterial cannula is placed in a carotid artery and connected to a fusion pump. Fluid is injected into the artery through the cannulated carotid artery. A representative example of the surgical procedure includes resuscitative endovascular balloon occlusion of the aorta.

10 Claims, 6 Drawing Sheets

(56) References Cited

U.S. PATENT DOCUMENTS

| | | | | |
|---|---|---|---|---|
| 6,234,804 B1* | 5/2001 | Yong | G09B 23/285 | 434/267 |
| 6,997,941 B2* | 2/2006 | Sharkey | A61M 25/0133 | 606/48 |
| 8,920,176 B1* | 12/2014 | Yang | G09B 23/303 | 434/262 |
| 9,472,122 B2* | 10/2016 | Sakezles | G09B 23/303 | |
| 9,589,483 B2* | 3/2017 | Buckman | G09B 23/28 | |
| 2003/0014016 A1* | 1/2003 | Purdy | A61B 17/12113 | 604/174 |
| 2003/0097082 A1* | 5/2003 | Purdy | A61B 17/12136 | 600/594 |
| 2003/0186203 A1 | 10/2003 | Aboud | | |
| 2007/0112327 A1* | 5/2007 | Yun | A61K 9/0034 | 604/500 |
| 2007/0185413 A1* | 8/2007 | Asai | A61M 25/002 | 600/585 |
| 2008/0262445 A1* | 10/2008 | Hsu | A61K 9/7053 | 604/307 |
| 2008/0293026 A1* | 11/2008 | Senagore | G09B 23/285 | 434/262 |
| 2010/0286581 A1* | 11/2010 | Hipp | A61F 5/055 | 602/18 |
| 2011/0287398 A1* | 11/2011 | Blackburn | G09B 23/285 | 434/267 |
| 2012/0034587 A1* | 2/2012 | Toly | G09B 23/285 | 434/267 |
| 2012/0191010 A1* | 7/2012 | Cabot | A61B 5/154 | 600/581 |
| 2017/0189347 A1* | 7/2017 | Valia | A61K 31/135 | |

* cited by examiner

CENTRAL PRESSURIZED CADAVER MODEL

CROSS-REFERENCE TO RELATED APPLICATION

This application is a national stage application under 35 U.S.C. § 371 of international application PCT/US2015/050660, filed Sept. 17, 2015, which claims benefit of priority under 35 U.S.C. § 119(e) of provisional application U.S. Ser. No. 62/051,331, filed Sept. 17, 2014, now abandoned, the entirety of which is hereby incorporated by reference.

BACKGROUND OF THE INVENTION

Field of the Invention

The present invention generally relates to the field of medical equipment. More specifically, the invention relates to a central pressurized cadaver model for the Resuscitative Endovascular Balloon Occlusion of the Aorta procedure.

Description of the Related Art

The use of endovascular technology in the treatment of injury has steadily increased over the last several decades. Most recently, resuscitative endovascular balloon occlusion of the aorta (REBOA) has emerged as a potentially lifesaving technique for severely injured patients that do not respond to volume as a bridge to hemostasis. Many case series of resuscitative endovascular balloon occlusion of the aorta have proved that this technique could be critical for patients in shock due to non-compressible hemorrhage.

Resuscitative endovascular balloon occlusion of the aorta involves passing a vascular sheath through a common femoral artery and inflating a balloon to occlude blood flow. The location of the balloon is selected based on the type of injury and a three-zones principle. Generally, a patient's body portion is divided into three zones as shown in FIG. 1. Balloon occlusion is performed in zone 1 for abdominal injuries and zone 3 for pelvic injuries. Zone 2 is considered a no-occlusion zone.

In a traumatic emergency, the execution of the resuscitative endovascular balloon occlusion of the aorta is highly complicated, thus requires extensive training. More often than not, resuscitative endovascular balloon occlusion of the aorta may not be in the standard armamentarium of many hospital privileges. Therefore, it is imperative that Acute Care Surgeons have gone through adequate training and each individual surgeon has demonstrated competence in this new technique before they start performing such a vascular procedure.

Currently, there are 3 main options for endovascular training. Virtual reality simulation (VRS) is a well-established method for skill development and its use in medical training has increased exponentially. Advantages for VRS include automated objective assessment and haptic feedback, no radiation exposure, and the ability to document and store progress development for each user. However, the absence of percutaneous cannulation and/or open exposure of the groin, which are essential considerable components of resuscitative endovascular balloon occlusion of the aorta, hindered the application of virtual reality simulation in resuscitative endovascular balloon occlusion of the aorta trainings. Animal testing provides dynamic blood flow and hemorrhage, but it lacks similarity to the access anatomy that is critical for mastering the resuscitative endovascular balloon occlusion of the aorta. In addition, animal testing can be subjected to ethical concerns for reasons of animal welfares.

Cadaver models provide real human anatomy and allow percutaneous and open arterial access through which the resuscitative endovascular balloon occlusion of the aorta procedure is performed. In real-life setting, the success of resuscitative endovascular balloon occlusion of the aorta is heavily dependent on correct and safe arterial access. The resuscitative endovascular balloon occlusion of the aorta may be performed exactly as in the resuscitation suite with x-ray capability and required equipment using cadaver models. However, the most challenging aspect of using cadaver model for this training is the lack of pulsatile blood flow, which is essential to simulate traumatic injuries.

Thus, there is a recognized need in the art for a cadaver model that provides pulsatile blood flow used in surgical training. Particularly, the prior art is deficient in this aspect. The present invention fulfills this long standing need and desire in the art.

SUMMARY OF THE INVENTION

The present invention is directed to a method for creating a pressurized cadaver model. In this method, a cadaver is first selected and internal jugular veins, common carotid arteries, brachial arteries, superficial femoral arteries and femoral veins thereof are exposed via incision. One internal jugular vein is ligated and a drainage tube is disposed in the other jugular vein. The common carotid arteries, the brachial arteries, the superficial femoral arteries and femoral veins of the cadaver are ligated. An arterial catheter is inserted in one brachial artery, proximal to the ligation thereon and a tube connected with a pressure transducer is subsequently attached to the arterial catheter. An arterial cannula is placed in a carotid artery and connected to a pressurized perfusion pump. A fluid is injected into the artery through the cannulated carotid artery.

The present invention is also directed to a training system for a surgical procedure that involves hemorrhagic shock. The training system comprises a cadaver and means for ligating veins of the cadaver. The training system also comprises a drainage tube disposed in an internal jugular vein of the cadaver and pressure tubing in a connecting relationship with the arterial catheter and an arterial catheter disposed in a brachial artery and a pressure transducer attached to the pressure tubing. One or more cannulas are disposed in a carotid artery, a common femoral artery or a combination thereof where one or more pressurized perfusion pumps are in a connecting relationship with the cannula. A blood replacement liquid is in a connecting relationship with the perfusion pumps.

BRIEF DESCRIPTION OF THE DRAWINGS

So that the matter in which the above-recited features, advantages and objects of the invention, as well as others that will become clear, are attained and can be understood in detail, more particular descriptions of the invention briefly summarized above may be had by reference to certain embodiments thereof that are illustrated in the appended drawings. These drawings form a part of the specification. It is to be noted, however, that the appended drawings illustrate preferred embodiments of the invention and therefore are not to be considered limiting in their scope.

DETAILED DESCRIPTION OF THE INVENTION

Figure 1:
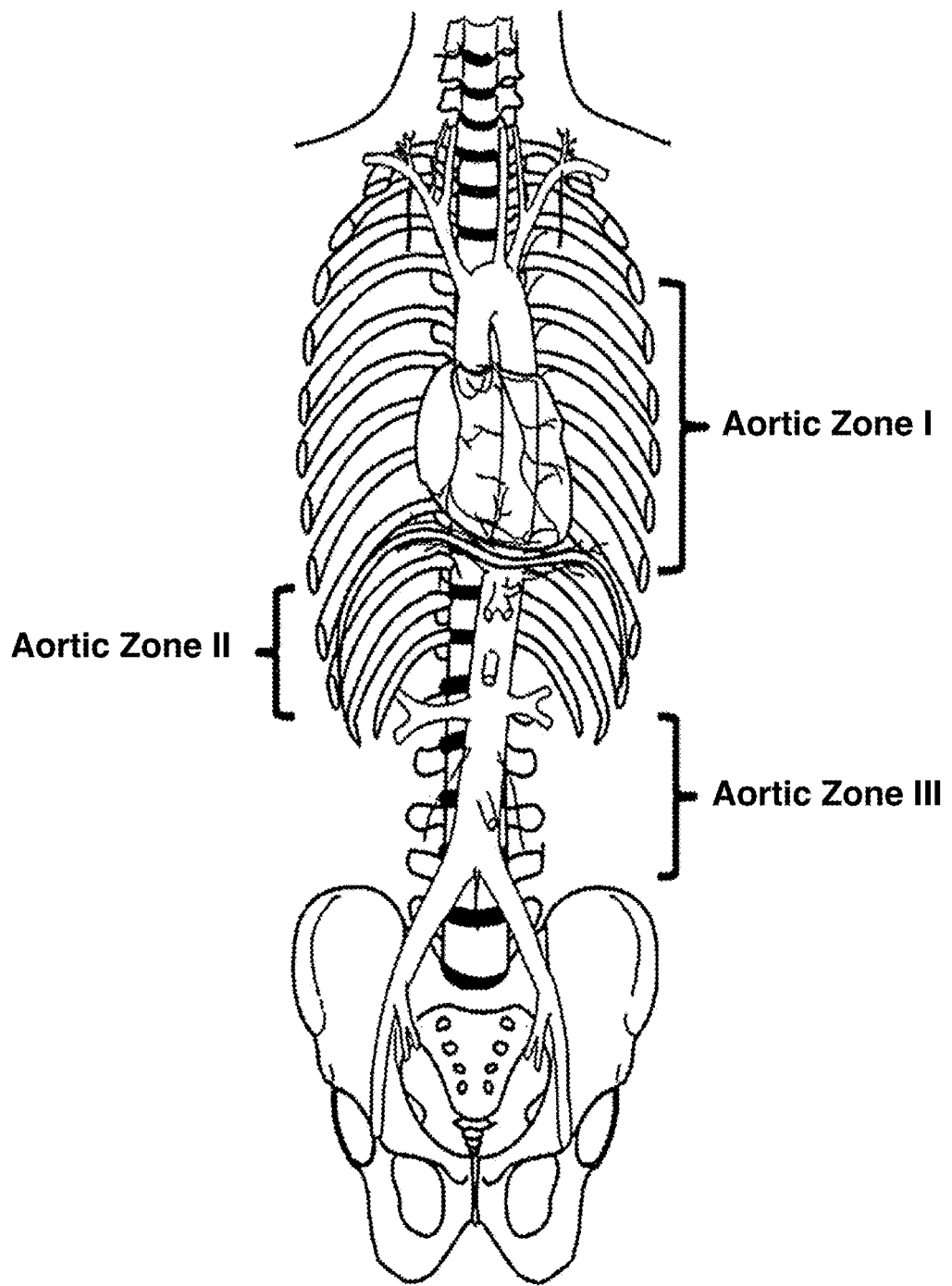
FIG. 1 depicts the three zones associated with REBOA blood occlusion.

As used herein in the specification, "a" or "an" may mean one or more. As used herein in the claim(s), when used in conjunction with the word "comprising", the words "a" or "an" may mean one or more than one.

As used herein "another" or "other" may mean at least a second or more of the same or different claim element or components thereof. Similarly, the word "or" is intended to include "and" unless the context clearly indicates otherwise. "Comprise" means "include."

As used herein, the term "about" refers to a numeric value, including, for example, whole numbers, fractions, and percentages, whether or not explicitly indicated. The term "about" generally refers to a range of numerical values (e.g., +/−5-10% of the recited value) that one of ordinary skill in the art would consider equivalent to the recited value (e.g., having the same function or result). In some instances, the term "about" may include numerical values that are rounded to the nearest significant figure.

In one embodiment of the present invention, there is provided a method for creating a pressurized cadaver model. The method comprises the steps of selecting a cadaver; incising the cadaver to expose internal jugular veins, common carotid arteries, brachial arteries, superficial femoral arteries and femoral veins thereof; ligating one internal jugular vein; disposing a drainage tube in the other jugular vein; ligating the common carotid arteries, the brachial arteries, the superficial femoral arteries and femoral veins of the cadaver; inserting an arterial catheter in one brachial artery, proximal to the ligation thereon; attaching a tube to the arterial catheter, the tube is connected with a pressure transducer; placing an arterial cannula in a carotid artery; connecting the cannula in the carotid artery to a pressurized perfusion pump; and injecting fluid into the artery through the cannulated carotid artery.

In this embodiment, the method further comprises a step of cannulating a right common femoral artery. In an alternative aspect of this embodiment, this method further comprises a step of cannulating a contralateral common femoral artery.

In a preferred embodiment, an arterial flushing is performed on the cadaver after the selecting step. Preferably, the arterial flushing is performed using boric acid solution. In this embodiment, the arterial catheter is an 18 gauge catheter. Preferably, the length of the arterial catheter is about 15 cm to about 16 cm. A representative example of the fluid injected in the artery includes a normal saline colored with red dye.

In this embodiment, the fluid courses through the cadaver in a pulsatile pattern to simulate hemorrhagic shock. Preferably, the pressure transducer reads a systolic blood pressure of about 40 mmHg to 80 mmHg.

In this embodiment, the cannulation of the right common femoral artery is performed using the Seldinger technique and a catheter is placed in the right common femoral artery. In an alternative aspect of this embodiment, the cannulation of the contralateral common femoral artery is performed using the Seldinger technique and a catheter is placed in the contralateral common femoral artery.

In another embodiment of the present invention, there is provided a training system for a surgical procedure that involves hemorrhagic shock. The training system comprises a cadaver; means for ligating veins of the cadaver; a drainage tube disposed in internal jugular vein of the cadaver; arterial catheter disposed in a brachial artery; pressure tubing in a connecting relationship with the arterial catheter; a pressure transducer attached to the pressure tubing; one or more cannulas disposed in a carotid artery, a common femoral artery or a combination thereof; one or more pressurized perfusion pumps in a connecting relationship with the cannula; and a blood replacement liquid in a connecting relationship with the perfusion pumps.

In this embodiment, the representative surgical procedures include but are not limited to resuscitative endovascular balloon occlusion of the aorta, device testing for large vessel occlusion, or a combination thereof. Preferably, an arterial flushing is performed on the cadaver.

In this embodiment, the length of the catheter is about 10 cm to about 20 cm. Preferably, the size of the catheter is about 14 gauge to about 22 gauge. In this embodiment, the arterial catheter is disposed proximal to a ligation of common carotid arteries, the brachial arteries, or common femoral arteries of the cadaver.

In a preferred embodiment, a representative example of the blood replacement liquid is a normal saline colored with red dye. The pressure transducer reads a systolic blood pressure of about 40 mmHg to about 80 mmHg to simulate a hemorrhagic shock.

Figure 2:
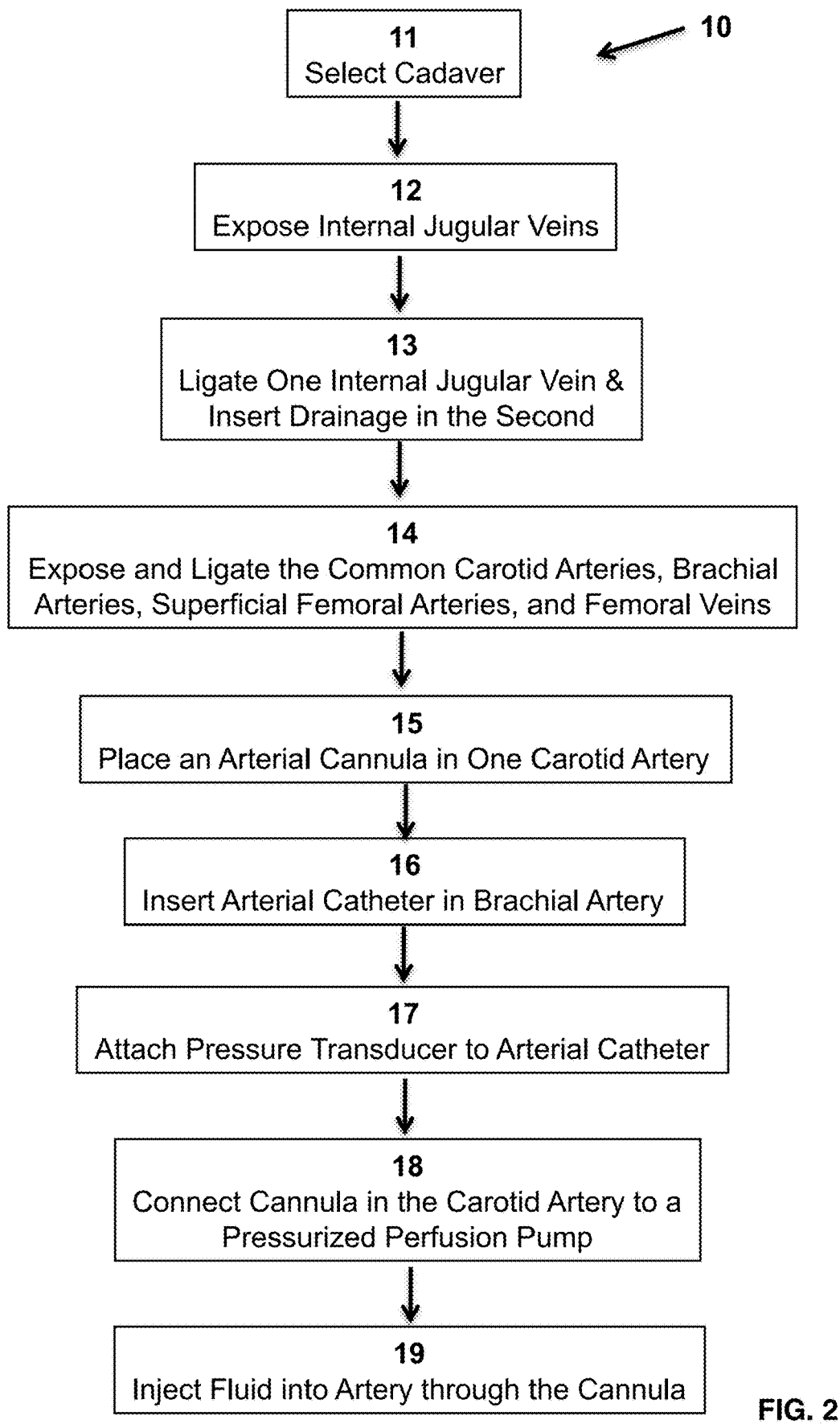
FIG. 2 is a flowchart that lists the steps for making one example pressurized cadaver model of the present invention.

Provided in this invention is a method for creating a central pressurized cadaver model that provides for training endovascular procedures, particularly REBOA. The flowchart 10 for this method is shown in FIG. 2. Although FIG. 2 describes integral steps in an order for purposes of illustration, the one or more steps, in other embodiments may be performed in a different order, or overlapping in time, in series or in parallel, or are omitted, or one or more additional steps are added, or the method may be changed in some combination of ways. In FIG. 2, the methods includes the steps of selecting a cadaver at 11; exposing the internal jugular veins at 12; ligating one internal jugular vein and placing a drain in the other at 13; exposing and ligating the common carotid arteries, superficial femoral arteries and femoral veins at 14; placing an arterial cannula in one carotid artery at 15; inserting an arterial catheter in one brachial artery, proximal to the ligation at 16; attaching a tube to the arterial catheter that communicates with a pressure transducer at 17; connecting the cannula in the carotid artery to a pressurized perfusion pump at 18; and injecting fluid into the artery through the cannulated carotid artery at 19.

The method may further comprise cannulating one of the common femoral arteries which may be performed by the Seldinger technique. Proper placement of the cannula in the common femoral artery may be confirmed by observing the return of the injected fluid in a minimally pulsatile function. This method may further comprise cannulating the contralateral common femoral artery which may be performed using the Seldinger technique. Again, verification of proper placement of the cannula may be confirmed by observing the return of the injected fluid.

The drainage tube may be placed in either internal jugular vein. However, in certain embodiments, the right internal jugular vein is preferred. Likewise, the arterial cannula may be placed in either carotid artery. However, in certain embodiments, the right carotid artery is preferred.

The arterial catheter that is placed in the brachial artery may be placed on either side. The catheter may be about 10 cm to 20 cm in length. More particularly, in some embodiments, the catheter is about 16 cm long. Also, the size of the catheter may range about 14 gauge to about 22 gauge, but in certain embodiments, an 18 gauge catheter is preferred. The pressurized perfusion pump may also be placed on either common carotid artery.

Any non-toxic fluid may be infused into the model. Saline is one exemplary fluid that may be used. In certain embodiments, it may be preferred to dye the injected fluid to provide additional contrast. Red dye may be used to give the model a more realistic feel.

EXAMPLE 1

Preparation of the Cadaver Model

Fresh cadavers are refrigerated at 36° F. with no embalming performed. Arterial flushing is performed prior to refrigeration with boric acid solution (B4, Hydrol Chemical Co, Yeardon, Pa.) to keep the body at a pH of 7.4. A body that has no, or minimal history of, severe peripheral vascular disease or vascular reconstruction is selected.

Figure 3:
FIG. 3 illustrates the placement of the cadaver in one exemplary configuration.
Figure 4:
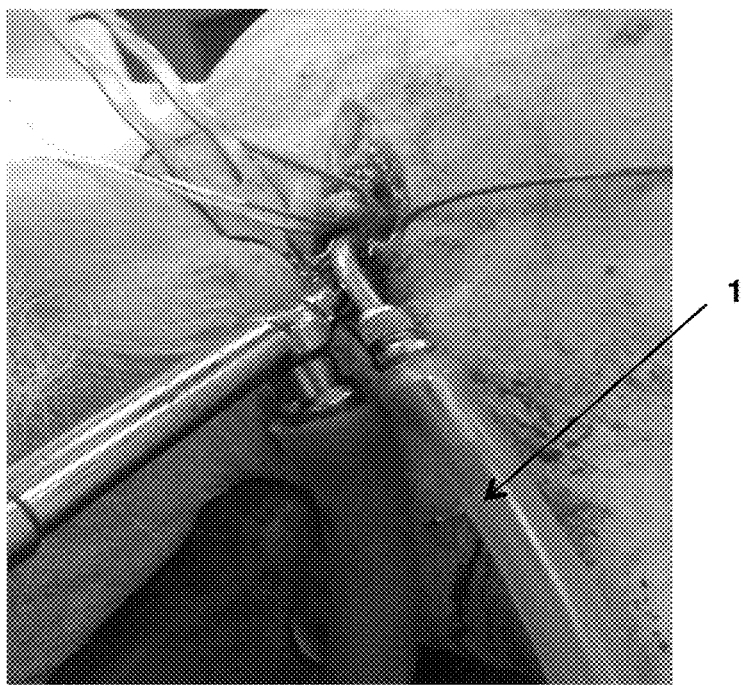
FIG. 4 illustrates the location of the drainage tube that is placed in the internal jugular vein in one example embodiment.
Figure 5:
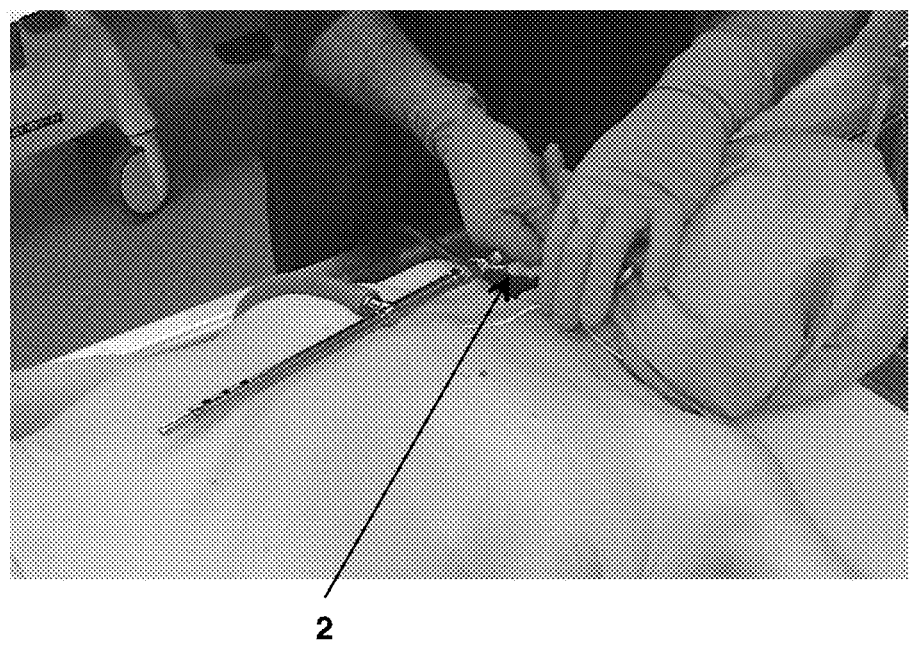
FIG. 5 shows the placement of the arterial cannula that is located in the right carotid artery.
Figure 6:
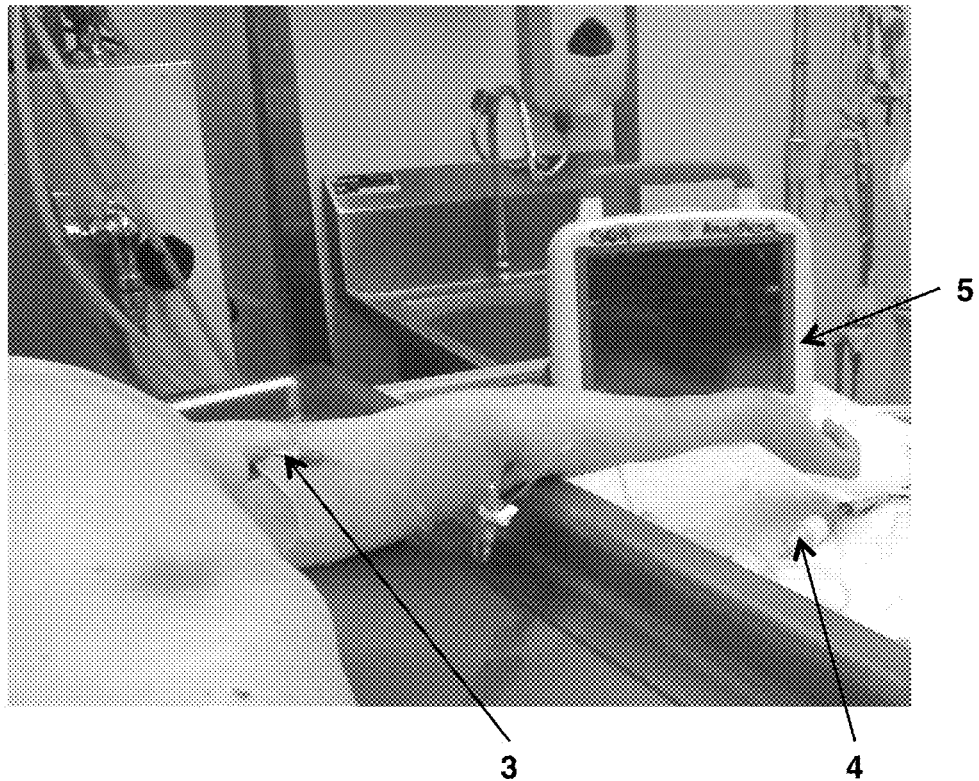
FIG. 6 depicts the arterial catheter that is placed in the left brachial artery and is attached to a pressure transducer.

The selected cadaver is placed on a fluoroscopy table with the head at the sink to allow easy drainage of perfusion fluid, as shown in FIG. 3. The bilateral internal jugular veins, common carotid arteries, brachial arteries, superficial femoral arteries, and femoral veins are exposed through appropriate incisions. A drainage tube 21 for intermittent drainage is placed in the right internal jugular vein as show in FIG. 4. An arterial cannula 22 for perfusate is placed in the right carotid artery (FIG. 5). The left internal jugular vein and the carotid arteries are ligated, as are the bilateral superficial femoral arteries, femoral veins, and brachial arteries in order to maximize perfusion to the central vasculature. A 18 gauge arterial catheter 23, about 16 cm, is placed in the left brachial artery proximal to the ligation, and attached to pressure tubing 24 and a portable pressure transducer 25, as shown in FIG. 6.

Figure 7:
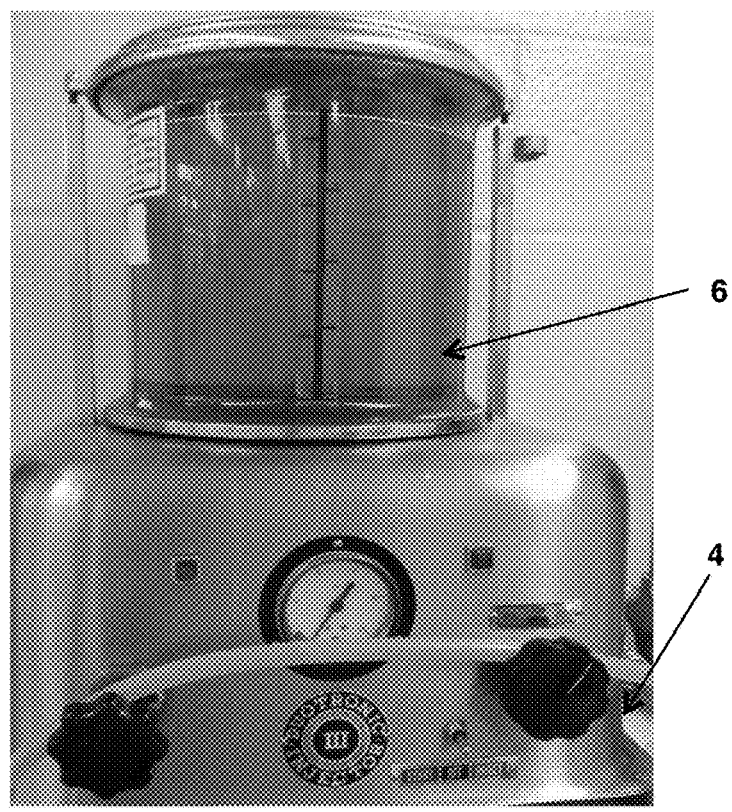
FIG. 7 shows one example perfusion pump that can be used with the cadaver model.
Figure 8:
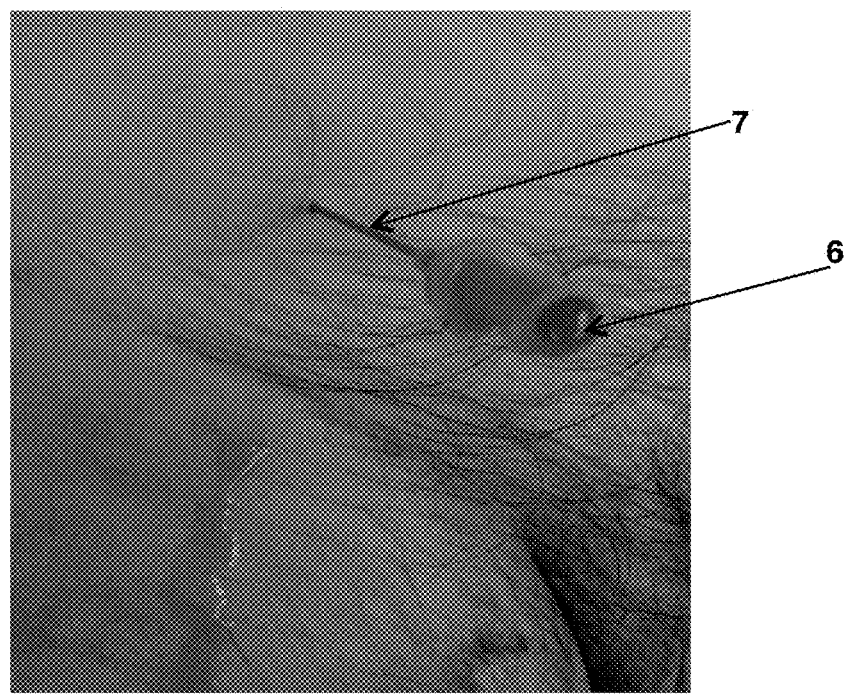
FIG. 8 illustrates the proper placement of percutaneous cannulation of the right common femoral artery.
Figure 9:
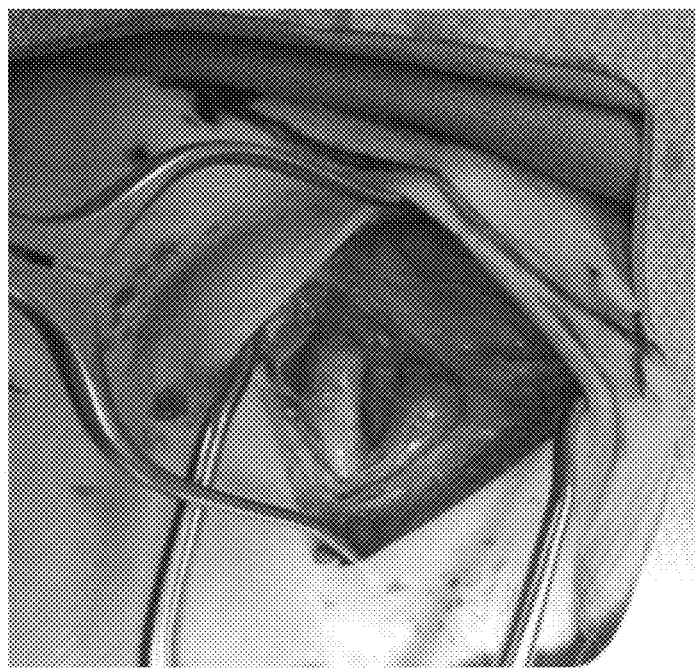
FIG. 9 depicts the step of making an incision to cannulate the contralateral common femoral artery.

The right common carotid artery cannula is connected to the pressurized perfusion pump shown in FIGS. 7, and 0.9% normal saline colored with red dye 26 is infused until the pressure transducer reads systolic blood pressure of about 50 mmHg to about 80 mmHg. Percutaneous cannulation of the right common femoral artery is performed using the Seldinger technique, and the arterial catheter is placed in the common femoral artery. Correct needle 27 access is confirmed by the red-colored fluid 26 return in a minimally pulsatile fashion (FIG. 8), as in the case of a patient in hemorrhagic shock. Open cannulation of the contralateral common femoral artery can also be achieved through the appropriate incision 30 (FIG. 9). The arterial line is placed using the Seldinger technique and once again luminal access is confirmed with return of red-colored fluid. Once cannulation is achieved, either percutaneously or by open groin cut-down, procedures such as the REBOA may be performed.

EXAMPLE 2

Training Procedure of Resuscitative Endovascular Balloon Occlusion of the Aorta

Figure 10:
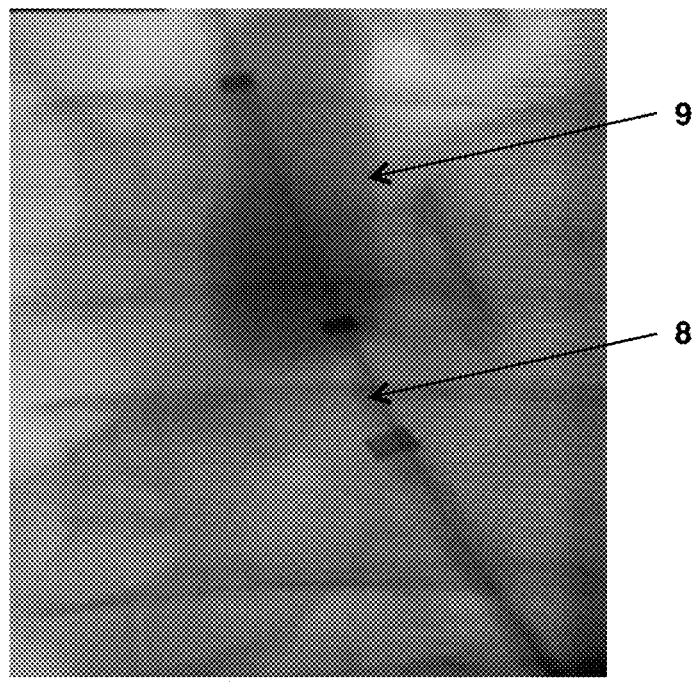
FIG. 10 is an exemplary image from a C-arm that depicts the location of an occlusive balloon following REBOA.

The Amplatz wire is advanced through the arterial catheter after approximation of insertion length by external landmarks. The arterial catheter is removed and a 12Fr sheath is inserted to allow access for the CODA balloon. The systolic blood pressure prior to inflation is about 40 mmHg to 80 mmHg, and infusate is pumped in a pulsatile fashion and titrated to this systolic blood pressure goal. If the systolic blood pressure rises about 80 mmHg, and infusate is pumped in a pulsatile fashion and titrated to his SBP goal. If the SBP rises above about 80 mmHg, prior to aortic occlusion, removal of fluid can be accomplished by venting the internal jugular cannula to allow drainage out of the central vasculature. A C-arm performs the function of a portable or digital X-ray machine by providing an image of the chest with wire 28 at the proximal descending thoracic aorta, as well as an image of the occlusive balloon 29 after inflation if necessary (FIG. 10).

Due to the continuous pressurized perfusion, the systolic blood pressure rises by about 20 to about 35 mmHg with corresponding improvement in arterial waveform after aortic occlusion. Once the improvement in systolic blood pressure is observed, the balloon is deflated and removed from the sheath. The rise in systolic blood pressure of about 20 to about 35 mmHg following arterial occlusion is slightly lower than that found in clinical series of about 55 ±20 mmHg. However, the increase and improvement in waveform is analogous. The procedure may be repeated several times, the exact number depends on cadaver edema, which can be minimized by pausing inflow during times of inactivity.

The subsequent removal of the 12Fr sheath requires surgical repair which can be performed at the completion of the procedure, or immediately on the side of the open groin as the exposure is already complete. Removal of the sheath and repair of the common femoral artery is an integral part of the REBOA procedure, and has the potential to incur severe injury, such as thromboemboli, dissection etc., if arterial repair is not performed correctly. Until technology provides lower profile devices which do not require open surgical arterial repair, training must include this final step of the REBOA procedure which cannot be obtained with VRS.

The present invention is well adapted to attain the ends and advantages mentioned as well as those that are inherent therein. The particular embodiments disclosed above are illustrative only, as the present invention may be modified and practiced in different but equivalent manners apparent to those skilled in the art. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee.

What is claimed is:

1. A method for creating a pressurized cadaver model, comprising:

selecting a cadaver with no medical history of severe peripheral vascular disease or vascular reconstruction from among unembalmed cadavers each maintained at a pH of 7.4 after an arterial flushing with a boric acid solution;

incising said cadaver to expose bilateral internal jugular veins, common carotid arteries, brachial arteries, bilateral superficial femoral arteries and femoral veins thereof;

ligating one of the bilateral internal jugular veins;

disposing a drainage tube in the other bilateral internal jugular vein;

ligating the common carotid arteries, the brachial arteries, the bilateral superficial femoral arteries and femoral veins of said cadaver;

inserting an arterial catheter into one brachial artery, proximal to the ligation thereon;

attaching a tube to said arterial catheter, said tube connected with a pressure transducer;

placing an arterial cannula into one of the common carotid arteries connecting the arterial cannula in the cannulated common carotid artery to a pressurized perfusion pump; and injecting fluid into the cannulated common carotid artery.

2. The method of claim 1, further comprising a step of cannulating a right common femoral artery.

3. The method of claim 2, wherein the cannulation of the right common femoral artery is performed using the Seldinger technique, and an arterial catheter is placed in the right common femoral artery.

4. The method of claim 1, further comprising a step of cannulating a contralateral common femoral artery.

5. The method of claim 4, wherein the cannulation of the contralateral common femoral artery is performed using the Seldinger technique, and a catheter is placed in the contralateral common femoral artery.

6. The method of claim 1, wherein said arterial catheter is an 18 gauge catheter.

7. The method of claim 1, wherein said arterial catheter has a length of about 15 cm to about 16 cm.

8. The method of claim 1, wherein said fluid is a normal saline colored with red dye.

9. The method of claim 1, wherein said fluid courses through the cadaver in a pulsatile pattern to simulate hemorrhagic shock.

10. The method of claim 1, wherein the pressure transducer reads a systolic blood pressure of about 40 mmHg to 80 mmHg.

* * * * *